United States Patent [19]
Daoud

[11] Patent Number: 6,127,627
[45] Date of Patent: Oct. 3, 2000

[54] OPTIMIZED WIRING HOUSING

[75] Inventor: Bassel Hage Daoud, Parsippany, N.J.

[73] Assignee: Lucent Technologies Inc., Murray Hill, N.J.

[21] Appl. No.: 09/118,738

[22] Filed: Jul. 17, 1998

[51] Int. Cl.[7] ...................................... H01J 5/00
[52] U.S. Cl. ........................... 174/50; 174/58; 174/60; 220/4.02; 385/135; 312/109
[58] Field of Search ................. 174/50, 48, 58, 174/60; 220/3.2, 3.8, 4.02; 385/135; 312/109

[56] References Cited

U.S. PATENT DOCUMENTS

| | | |
|---|---|---|
| 3,611,264 | 10/1971 | Ellis . |
| 4,012,580 | 3/1977 | Arnold ....................................... 174/53 |
| 4,662,699 | 5/1987 | Vachhani et al. . |
| 4,913,659 | 4/1990 | Doyle . |
| 5,363,440 | 11/1994 | Daoud . |
| 5,933,563 | 8/1999 | Schaffer et al. ......................... 385/135 |

OTHER PUBLICATIONS

Technical Data Sheet of A.C. Egerton Limited, related to Mini Rocker Cross Connector Cabinets, No Date.

*Primary Examiner*—Dean A. Reichard
*Assistant Examiner*—Dhiru R Patel
*Attorney, Agent, or Firm*—Stroock & Stroock & Lavan LLP

[57] ABSTRACT

A housing for distributing conductors from a cable includes an enclosure, and an insertable chamber separator detachably mounted to and disposed within the enclosure for dividing the enclosure into chambers. The separator includes a first dividing wall for dividing the volume of the enclosure along a first plane and a second dividing wall for dividing the volume of the enclosure along a second plane.

29 Claims, 8 Drawing Sheets

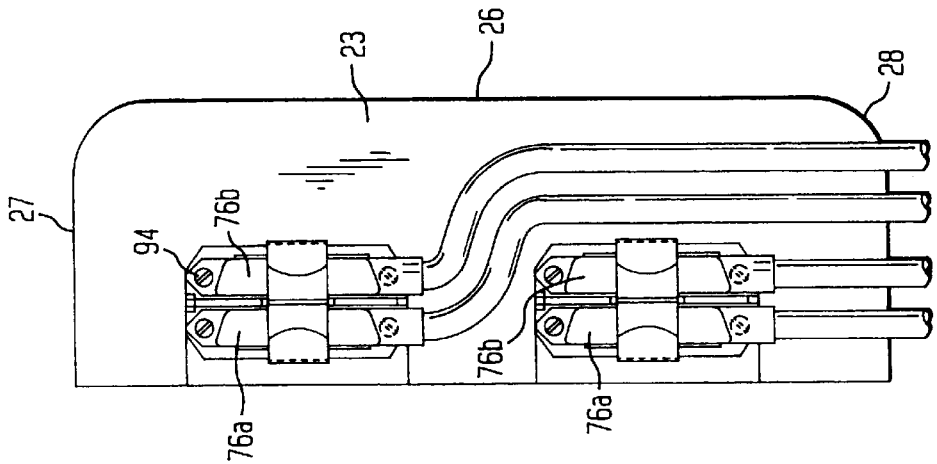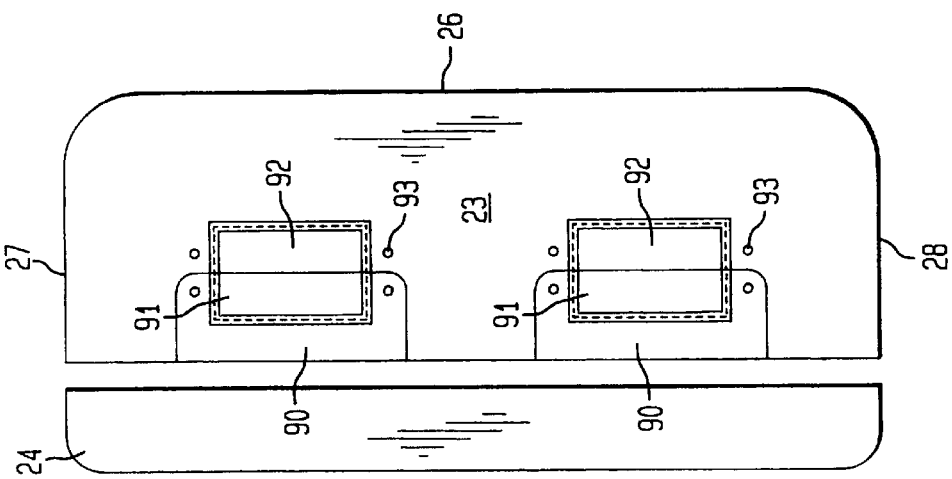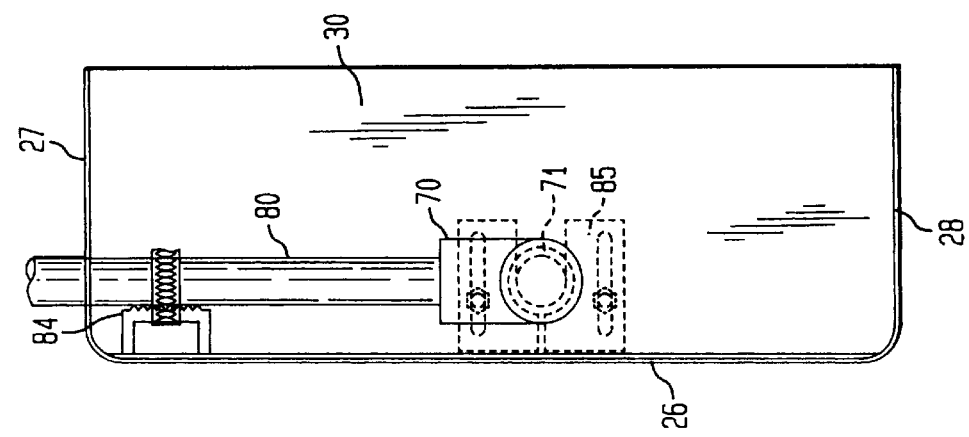

OPTIMIZED WIRING HOUSING

FIELD OF THE INVENTION

This invention relates to a housing for interfacing telephone lines with a network and for distributing multiple wire pairs to various local and/or remote locations within or without a building.

BACKGROUND OF THE INVENTION

Telephone lines, which are carried by electrical conductors known as tip ring wire pairs, are generally aggregated at a particular point in a building prior to being distributed and connected to various types of telephone equipment, such as, for example, telephones, fax machines, modems, etc. Tip ring wire pairs generally enter the building as part of a multi-conductor cable, and, as such, must be broken out from the cable into individual wire pairs prior to connecting individual pairs. This is normally accomplished in a junction box commonly known as a building entrance protector (BEP) and/or network interface unit (NIU). Within such devices the individual telephone line tip ring pairs are separated from the cable, individually connected to a connector block, and made available for further electrical connection and distribution. Usually, a protector device is inserted between the telephone central office (or the network side of the telephone line) and the customer equipment (or terminal side of the telephone line) to protect the telephone or other equipment connected to the telephone line and the user of such equipment from hazardous overvoltages induced in the telephone network or in the cables passing between the telephone central office and the building within which the line is terminated.

BEP housings are generally fabricated from a number of individual components or compartments. One example of a prior art BEP housing is shown in FIG. 1, and is generally indicated at 320. Such a BEP housing typically includes a swivel stub mounting panel 355 for providing a location at which a cable (not shown) enters the BEP, a component mounting panel 356 mounted to swivel stub mounting panel 355 to form a wiring chamber 340, a network cover support bracket 357 mounted to component mounting panel 356, and a network cover 358 hingedly connected to network support bracket 357 to form a network chamber 350. Component mounting panel 356 may serve as a mounting site for electrical components, such as a connector block 375 and a surge protector panel 374. In addition, such prior art configurations often include a connector module 359, having a mounting cover 354 for providing a location to mount a multi-pair connector, most typically a twenty-five pair connector, such as an RJ21 type connector 376, and a splice chamber 330, having a base 352, and a chamber cover 323 connected to base 352 by a hinge 325, for providing an enclosed area to splice wires.

These separate modules or housing components are combined in a wide variety of configurations to satisfy customer requirements and comply with local BEP codes. As a result, it is necessary to employ a costly stocking process to ensure that a large number of each of these components are available to quickly fabricate a specific BEP design.

In addition, mounting the multiple components or compartments of a prior art configuration requires a significant labor expenditure. In a typical arrangement, a telephone line entering housing 320 is first broken out into individual pairs in splice chamber 330. Alternatively, the telephone line may be broken out in wiring chamber 340. The individual pairs are then wired to protector panel 374, which in turn is hard wired to connector block 375. Connector block 375 provides a first test point for testing the telephone line connections between the building and telephone central office. This first terminal block is then hard wired to a multi-pair connector, such as RJ21 connector 376, for further connection to a customer bridge, which may also be hard wired and connectorized via a mating RJ21 connector. When the installer connects wiring between components located in different compartments, the installer must pass the wiring through holes in the compartment walls. Depending on the local code, the wiring may have to be protected by a conduit or the like requiring further labor to complete assembly.

Further, depending on the design of the building and the number of telephone pairs required, BEPs may be stacked one above the other on a support surface, generally a wall or back plane. Where the incoming cable is passed behind swivel stub mounting panel 355, as is shown in FIG. 1, and into swivel stub 370, it becomes difficult to lay a second cable alongside a previously laid cable due to space restrictions. Finally, the multi-compartment configuration of the prior art requires a mounting area large enough to support such a structure.

Thus, in a prior art configuration it is necessary to mount a number of different components, and at specific points during assembly to run wire through cutouts in those components. This system of assembly requires that much of the installation be done at the site, often at locations that make it difficult to quickly complete the assembly process.

SUMMARY OF THE INVENTION

The present invention is directed at overcoming the shortcomings of the prior art. Specifically, the invention is directed to a housing for terminating and distributing wire pairs from a cable, the housing comprising a single, unitary enclosure and an insertable compartment separator inserted into the enclosure for dividing the enclosure into various compartments as required, and a cover. The enclosure preferably consists of a molded base and a mating cover hingedly attached to the base. The separator may be used as a mounting site for various electrical components, such as, a surge protector panel and connector blocks, and may be pre-wired for modular insertion into the unitary enclosure, thereby simultaneously eliminating the need to assemble multiple component chambers on-site, and simplifying the wiring task.

The separator is preferably T-shaped, and inserted such that the "cross" of the T-shape (or depth divider) extends from the back of the enclosure to the inner surface of the enclosure cover. In this manner, the depth divider, together with a portion of the back wall of the enclosure, the top, bottom and a side wall of the enclosure base, and a portion of the enclosure cover, create a splice chamber in the unitary enclosure base. The depth divider can also support a swivel stub, which is preferably contained within the splice chamber, and which channels a multi-conductor cable to the housing where individual wire pairs may be broken out.

The portion of the separator conforming to the upstanding portion of the T shape (or length divider) extends substantially perpendicularly from the depth divider to the inside surface of a second side wall of the enclosure opposed to the depth divider to separate the remaining portion of the enclosure into two separate compartments—the wiring chamber and the network chamber. The length divider itself can also be used as a mounting site for various electrical components, including a surge protector panel, connector blocks and other connectors. The splice chamber or the wiring chamber provides an area in which individual line pairs may be broken out from the multi-conductor cable and attached to a splice connector and/or the surge protector panel and in turn to the connector block. Further, the length divider may have one or more through holes or knockouts through which conductors may be run from the wiring chamber to the network chamber.

A side wall of the enclosure provides a mounting location for RJ21 interconnect plugs. This side wall may include knockouts, such as those described in U.S. patent application Ser. Nos. 09/039,745, entitled BLANK PANEL WITH INTEGRATED PHYSICAL COVER AND MOUNTING ARRANGEMENT FOR A RJ 21 CONNECTOR, filed on Mar. 16, 1998, and U.S. patent application Ser. No. 09/039,817, entitled A CONNECTOR MOUNTING ARRANGEMENT IN A CENTER LOCATION OF A PLASTIC BOX, filed on Mar. 16, 1998, the entire disclosures of which are incorporated herein by reference. These knockouts permit the installer to run conductors from the network chamber to a first RJ21 directly, and/or through the length divider throughhole and the wiring chamber to a second RJ21. In addition, the installer may run conductors from the wiring chamber directly to the second RJ21 through a knockout, or through the through hole and the network chamber to the first RJ21 connector.

By providing an insertable separator, the equipment component/wiring layout for any given design may be factory pre-installed on the separator at a location remote from the installation site. Therefore, on-site assembly time is further reduced, as the electrical components are mounted and wired prior to installation. In addition, by standardizing the enclosure base, the number of housing components required to be mounted at the installation site is greatly reduced, thereby eliminating the need for stocking and assembling the many housing components of the prior art configuration. In this manner, stocking costs are reduced, mounting space is conserved, and installation may be conducted more efficiently.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views:

FIG. 8 is a left-side cross-sectional view of the housing of the present invention;

FIG. 9 is a right-side exploded view of the housing of the present invention; and FIG. 10 is a right-side view of the base of the present invention having RJ21 connectors mounted thereon.

DETAILED DESCRIPTION OF THE PREFERRED EMBODIMENTS

Figure 2:
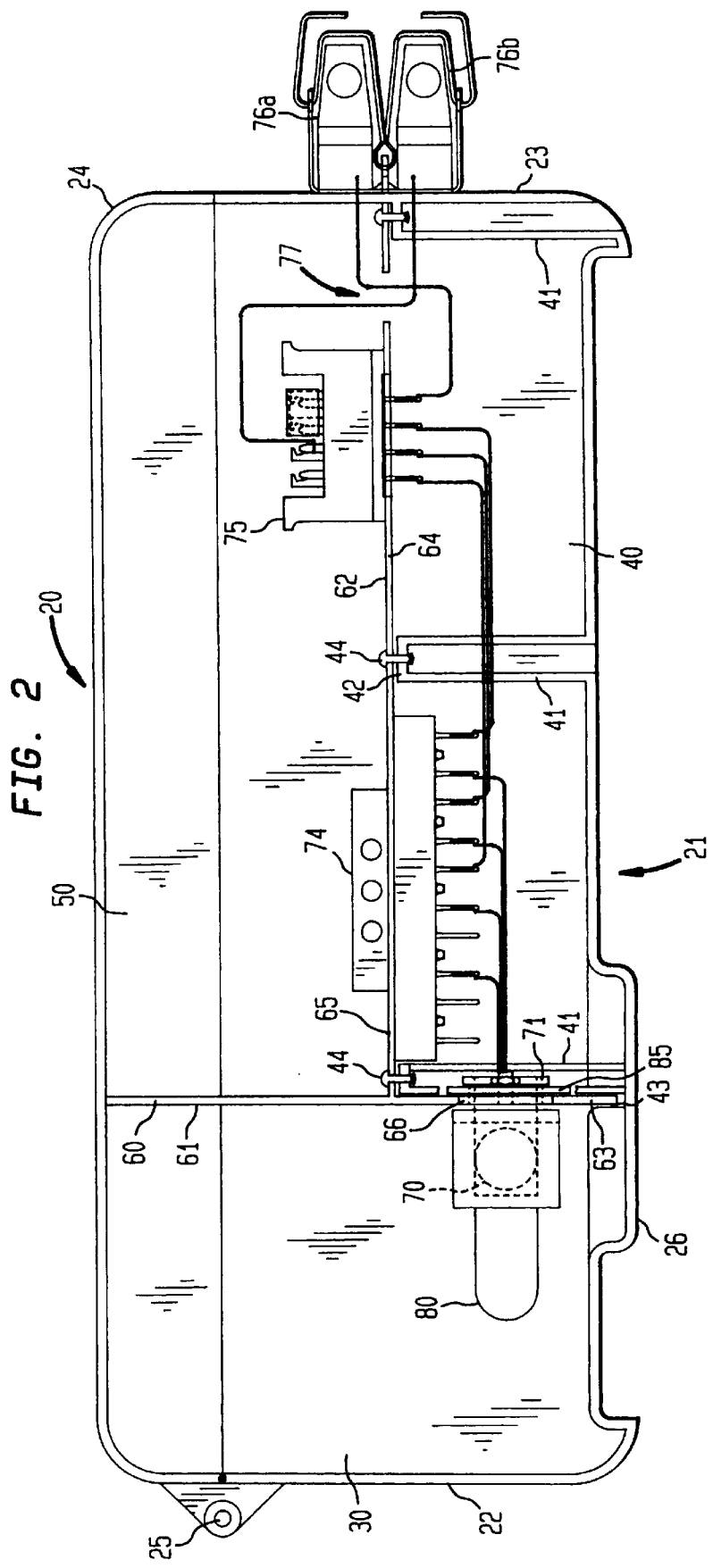
FIG. 2 is a bottom cross-sectional view of the housing of the present invention.

With initial reference to FIG. 2, there is depicted an exemplary wiring housing in accordance with the present invention, generally indicated as 20, for distributing wire pairs from a cable 80. Housing 20 is preferably configured as an enclosure for use as, by way of non-limiting example, a building entrance protector (BEP) and/or a network interface unit (NIU). Housing 20 includes a base 21, generally forming the rear half of housing 20, and a base cover 24 hingedly connected to base 21, generally forming the front half of housing 20. The interior of housing 20 is divided into three chambers—a splice chamber 30, a wiring chamber 40, and a network chamber 50—by a separator 60, generally T-shaped when viewed edge on or in cross section as shown, which is substantially disposed within base 21 of housing 20.

Figure 3:
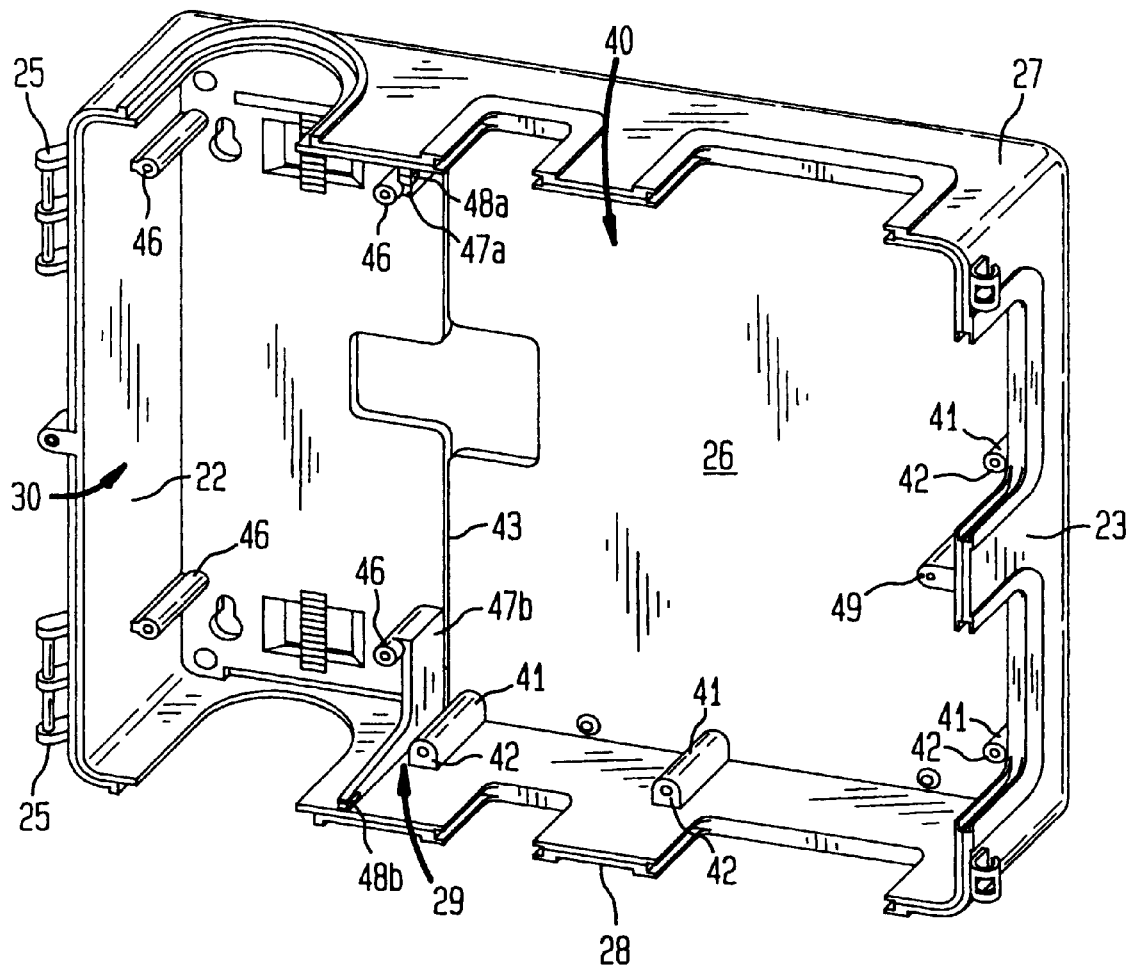
FIG. 3 is a perspective view of a housing base of the present invention without the insert.

As is shown in FIG. 3, base 21 includes a rear wall 26 from which extends side walls 22 and 23, a top wall 27 and a bottom wall 28. Base 21 is preferably formed from a single mold, but may consist of one or more components which form a unitary base structure, such that when combined with separator 60, and as further described herein, multiple chambers and mounting surfaces are formed within the enclosure with no need to assemble multiple housing components to form such chambers and/or surfaces. Cover 24 is sized to mate with base 21, and is connected to base 21 by means of a hinge 25 for sealing housing 20. Base 21 and cover 24 may be formed of a plastic, metal or synthetic material or any other suitable material, or any combination thereof. Hinge 25 may be any pivotable connection permitting relative angular movement between cover 24 and base 21, such as, for example, multiple individual hinges, a piano hinge, a living hinge, or other art-recognized pivotable connections.

Figure 4:
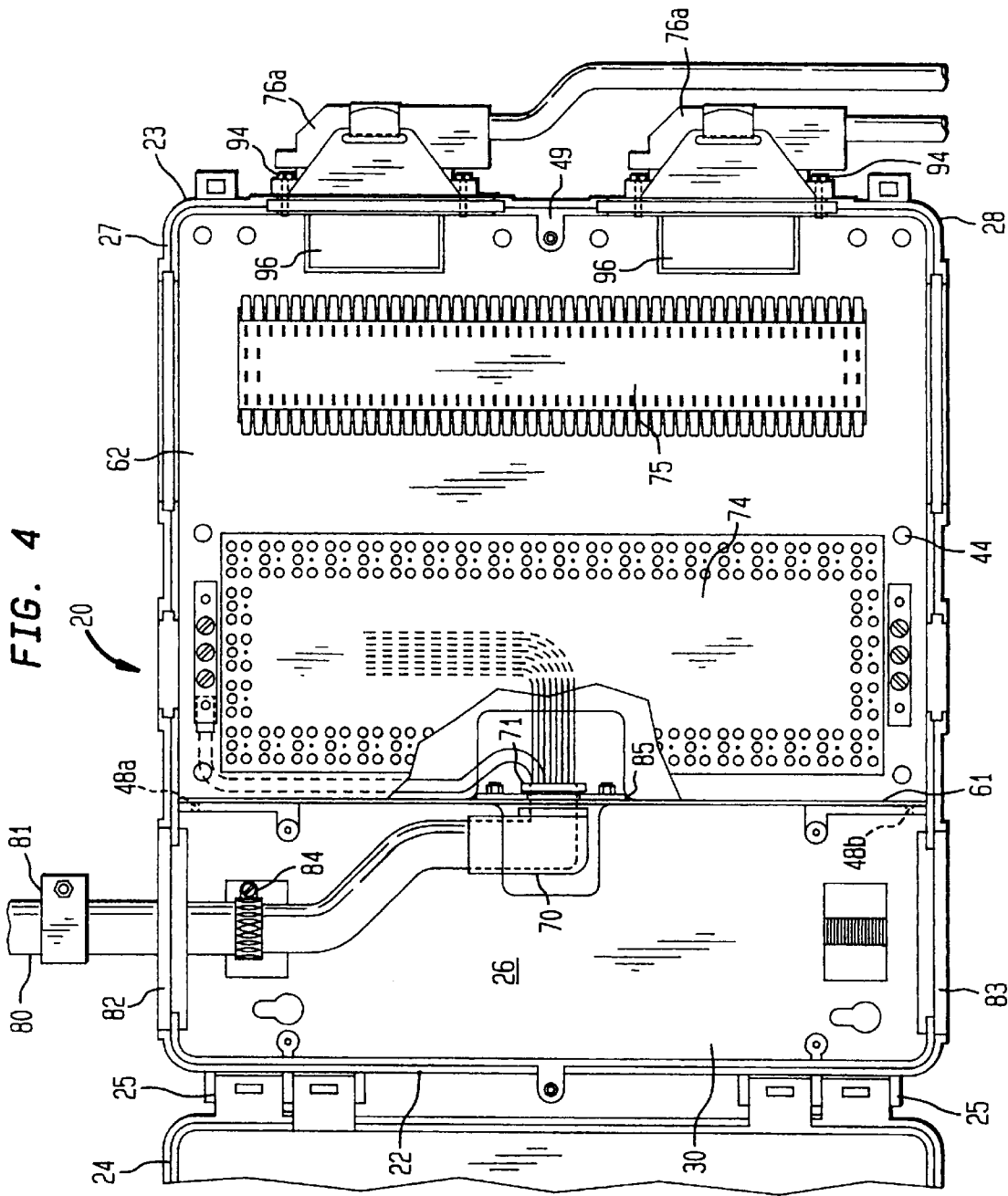
FIG. 4 is a front elevational, partial cutaway view of the housing of the present invention with the housing door in the open position and with the insert mounted therein.

As is shown in FIGS. 3 and 4, base 21 and base cover 24 may be joined by an optional securement device having a male mating portion (not shown) connected to cover 24 and a female mating portion 49 connected to base 21 that permits a user to lock housing 20. The securement device may be a lock, latch, screw, magnetic closure or other art-recognized means of maintaining the housing in a closed position.

In a first embodiment of the invention shown in FIG. 2, separator 60 is formed in the shape of a "T" when viewed edgewise, and may be fabricated by bending a single sheet of metal into the T shape. Separator 60 may formed of a metal, plastic, synthetic material, or any other material suitable to the application in which the invention will be deployed, or any combination thereof, as a matter of simple design choice. In addition, separator 60 may be formed of one or more sheets of material welded, bonded or otherwise suitably joined.

As shown in FIG. 2, separator 60 includes a depth divider 61, which forms splice chamber 30 and separates it from the remainder of the enclosure when separator 60 is inserted into base 21, and length divider 62, which forms wiring chamber 40 and network chamber 50 and also separates the two chambers. Preferably, depth divider 61 extends from rear wall 26 of base 21 to the inner surface of base cover 24, thereby acting to completely seal splice chamber 30 from the remainder of housing 20 and dispensing with any need for a separate cover for splice chamber 30.

Figure 1:
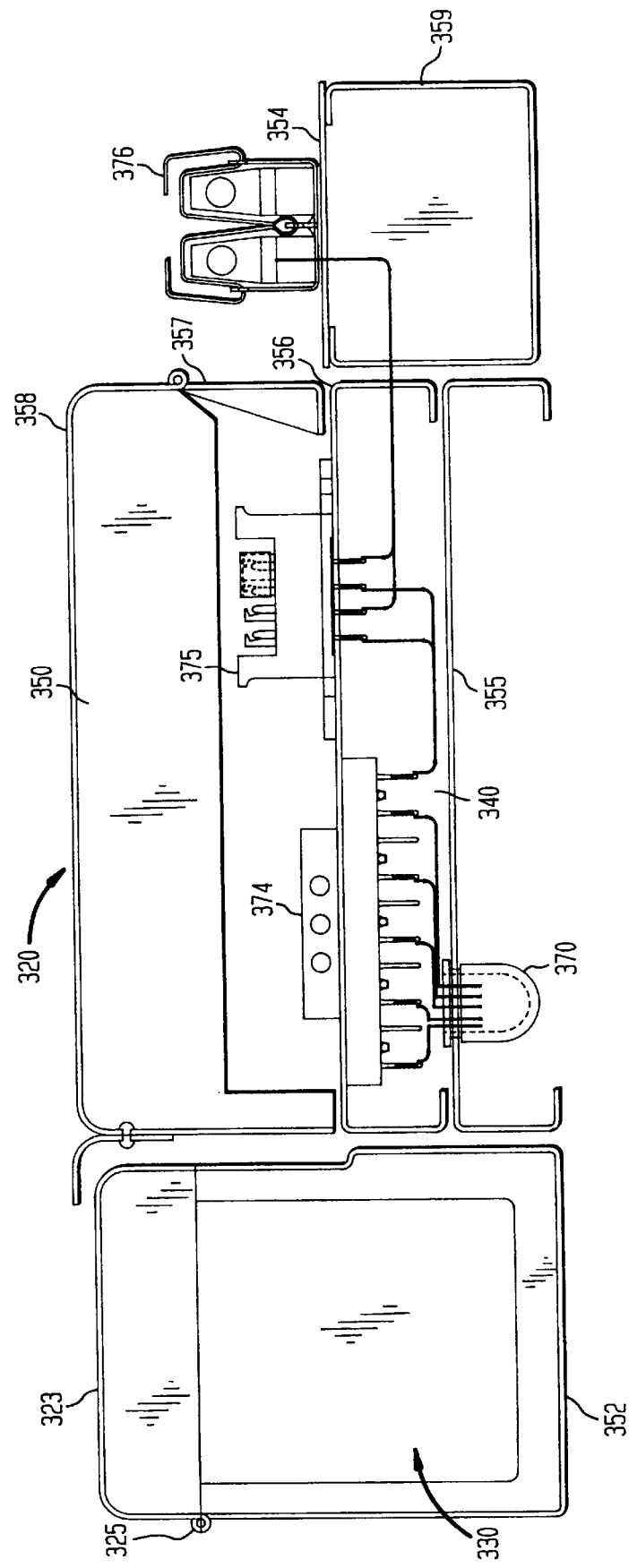
FIG. 1 is a bottom cross-sectional view of a prior art housing.

Referring to FIGS. 2 and 4, both depth divider 61 and length divider 62 extend vertically from bottom wall 28 to top wall 27 of base 21. By designing housing 20 to include an integral splice chamber 30 when separator 60 is inserted, the installer no longer needs to install a separate splice chamber 330 as is shown in FIG. 1. Depth divider 61 may preferably be formed with an opening 66 to permit a swivel stub 70 to be mounted therein such that swivel stub 70 is located in splice chamber 30 and can channel the individual wire pairs of cable 80 (FIG. 4) into wiring chamber 40. By locating swivel stub 70 in splice chamber 30, swivel mounting panel 355 shown in FIG. 1 is no longer a necessary component of housing 20. Moreover, quick assembly and wiring is facilitated and greatly simplified, since wiring connections between the swivel stub and wiring chamber may be done at the factory, and need not be performed in the field.

Referring to FIGS. 2 and 4, length divider 62 extends in the horizontal direction (FIG. 2) from depth divider 61 to side wall 23. The surface of length divider 62 provides a mounting site for various electrical components, including, by way of non-limiting example, a protector field 74 and a connector block 75. In most configurations, the individual wire pairs enter housing 20 through splice chamber 30 and are hard wired to protector field 74 in wiring chamber 40 to protect the equipment to which a wire pair is connected (and the user of such equipment), in an art-recognized manner, from hazardous overvoltages induced in the telephone network or in cable 80, which passes between the telephone central office and housing 20. The individual wire pairs are then in turn hard wired to connector block 75, which provides a test point for testing the telephone line connections between the building and the telephone central office. Connector block 75 may then be hard wired to a multi-pair connector, such as an RJ21 connector 76a, which in turn may be wired to a customer bridge (not shown). In one embodiment, length divider 62 is formed with at least one opening 77 to permit the installer to hard wire connector block 75 to one of a pair of RJ21 connectors 76a, 76b from either network chamber 50 or wiring chamber 40. Alternatively, length divider 62 may include knockouts 96, as shown in FIG. 4, which facilitate the flexible creation of openings 77 by the installer. Such an embodiment has the additional benefit of completely separating wiring chamber 40 and network chamber 50 unless the installer needs to pass wires between the chambers. Of course, the person of skill will recognize from the teachings herein that the specific configuration of component layout and/or wiring scheme, whether field installed or factory installed, is readily adaptable to many application specific requirements, as a matter of design choice, all of which are facilitated by the flexibility afforded by the unitary housing and modular insert of the present invention.

Once separator 60 is inserted into base 21, it is preferably securely mounted to base 21. Referring to FIG. 3, bosses 41 extend normally from rear wall 26 in wiring chamber 40. Bosses 41 each include a face 42 to which length divider 62 of separator 60 is mounted. Rear wall 26 is also formed with a slot 43 sized to accommodate the width of depth divider 61. Thus, when separator 60 is inserted into and mounted to housing 20, as is shown in FIG. 2, a rear portion 63 of depth divider 61 is accommodated in slot 43 and a rear surface 64 of length divider 62 abuts faces 42 of bosses 41. Length divider 62 is preferably mounted to faces 42 of bosses 41 by pop rivets 44, but may be mounted by any means known in the art, such as, screws, glue, heat welds, ultrasonic welds, etc. To further support separator 60, referring to FIG. 3, members 47a and 47b, which extend from rear wall 26 in a direction substantially parallel to side wall 22, are provided. A channel 29 (FIG. 3) is formed between members 47a and 47b and those bosses 41 adjacent members 47a and 47b, and is sized to accommodate depth divider 61 of separator 60. Members 47a and 47b have slots 48a and 48b, which provide locations for securement of depth divider 61 to base 21 using a device such as a screw, cable tie, pop rivet or any other means known to the person skilled in the art.

Bosses 46 extend from rear wall 26 in splice chamber 30 to provide a mounting surface for a splicing connector (not shown). Bosses 41 and 46 are preferably integrally formed with base 21, but may be attached to base 21 in any manner known to one skilled in the art, such as by a connector device, by heat molding, gluing, welding or the like.

Referring to FIG. 4, cable 80 may enter splice chamber 30 either through an opening in a top panel 82 or a bottom panel 83 of splice chamber 30. Prior to entering splice chamber 30, cable 80 is typically secured to a mounting surface by a bracket 81. As is shown most clearly in FIG. 8, after entering splice chamber 30, cable 80 is generally strain relieved by gripping cable 80 with a strain relief 84 mounted on rear wall 26, in an art-recognized manner. In the embodiment shown in FIG. 4, cable 80 is then channeled to wiring chamber 40 by way of swivel stub 70. Alternatively, the individual pairs of wires in cable 80 may be broken out in splice chamber 30 and connected to a splicing connector (not shown) within splice chamber 30 prior to being hard wired to a protector panel in wiring chamber 40. Swivel stub 70 is capable of pivoting at least 180° to accept cable 80 whether it enters through top panel 82 or bottom panel 83 of splice chamber 30. Swivel stub 70 may be secured to depth divider 61 by a securement plate 85, which engages flange 71 of swivel stub 70, and may be secured to depth divider 61 by any means known to those skilled in the art.

In another embodiment, cable 80 may pass through splice chamber 30 out an opening in top panel 82 or bottom panel 83 to a second housing mounted adjacent housing 20. In this manner, splice chamber 30 can form a trough through which cable 80 passes, thereby facilitating the installation of multiple housings at the same location by permitting the installer easy access to cables passing through one or more housings to the housing in which the wire pairs are broken out.

As is shown in FIG. 9, side wall 23 is preferably provided with panels 90, which are spaced apart in the vertical direction, positioned adjacent network chamber 50, and include knockouts 91, and a further set of knockouts 92 that abut knockouts 91 of panel 90 and are positioned adjacent wiring chamber 40. Depending on the customer's requirements, the installer may remove one or more of knockouts 91 and 92 to permit access to an RJ21 connector 76a, 76b. Referring to FIG. 10, RJ21 connectors 76a, 76b may be secured to rear wall 26 by a securement device, such as screws 94, which are screwed into screw holes 93 of side wall 23. Typically, cable 80 contains 100 individual pairs of telephone wires, and up to 25 of these pairs may be connectorized using each RJ21 connector 76a, 76b. Therefore, housing 20 is preferably provided with a total of four knockouts 91 and 92 so that a total of four RJ21 connectors may be secured directly to housing 20. By mounting RJ21 connectors 76 to side wall 23 of housing 20, the installer no longer needs to mount prior art RJ21 module 359 and mounting cover 354 as is shown in FIG. 1, thereby reducing installation time and the components necessary to distribute wire pairs.

As is shown in FIG. 4, a pair of RJ21 connectors 76a, 76b is preferably mounted on side wall 23 of housing 20 such that RJ21 connector 76a is adjacent to network chamber 50 and the RJ21 connector 76b is adjacent network chamber 40. Such a design increases installation flexibility as RJ21 connector 76a may be accessed directly from network chamber 50 through knockout 91 or from wiring chamber 40 through opening 77 in length divider 62 and knockout 91, and RJ21 connector 76b may be accessed directly from wiring chamber 40 through knockout 92 or from network chamber 50 through opening 77 in length divider 62. Various RJ21 connector wiring combinations are depicted in FIGS. 2 and 5–7.

While separator 60 is depicted as dividing housing 20 into a front, network chamber 50 and a rear, wiring chamber 40, separator 60 may also be configured to divide the volume of housing 20 in any number of ways. For example, separator 60 can consist of a depth divider 61 that lies in a plane substantially parallel to side walls 22 and 23 and a length divider attached to depth divider 61 that lies in a plane substantially parallel to top wall 27 and bottom wall 28 to form an upper chamber and a lower chamber. Further, separator 60 may include more than two dividing walls to divide enclosure into more than three compartments or to provide additional support.

Figure 5:
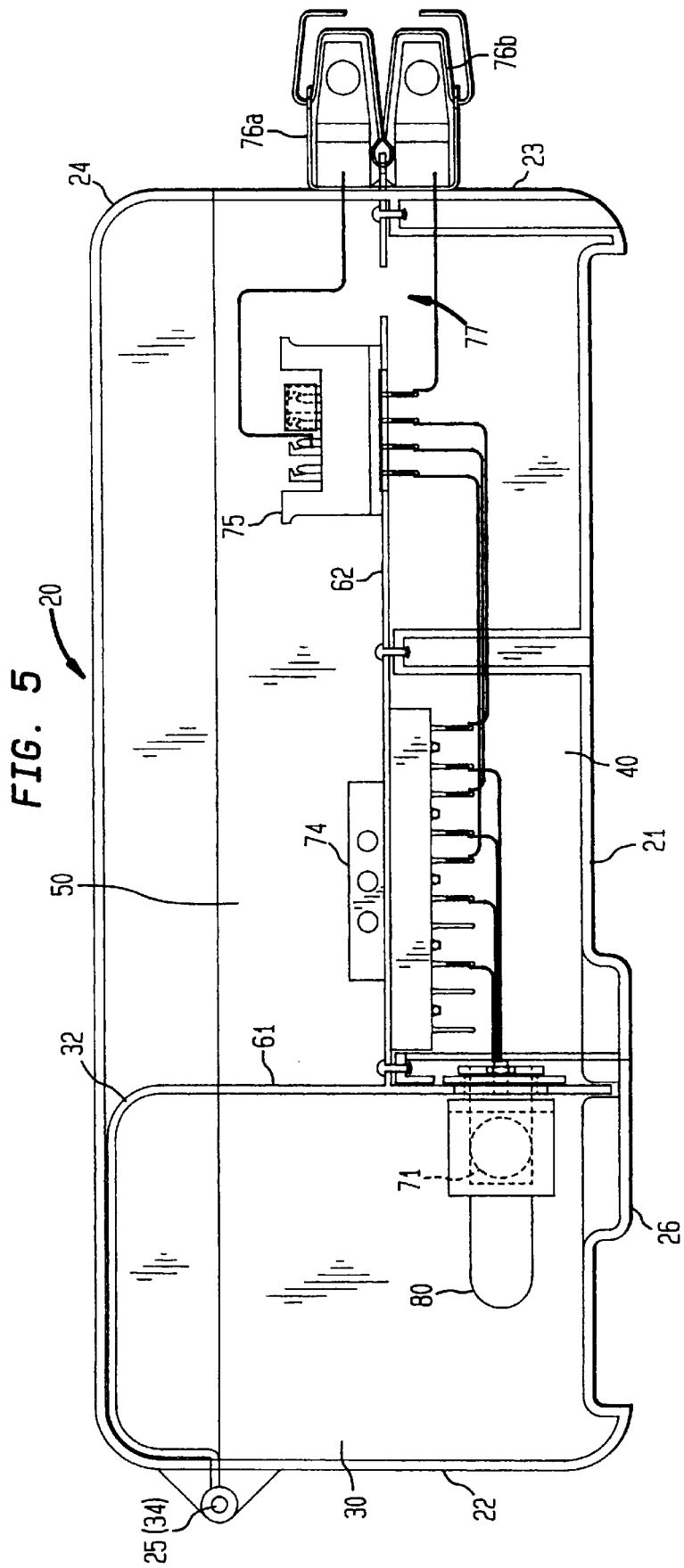
FIG. 5 is a bottom cross-sectional view of an alternate embodiment of the housing of the present invention.

Referring to FIG. 5, a second embodiment of the invention is depicted. In this embodiment, splice chamber 30 includes a cover 32, which shares hinge 25 with base cover 24. Alternatively, cover 32 may be connected to base 21 by a separate hinge 34 spaced apart from hinge 25 in the substantially the same vertical plane. In this embodiment, depth divider 61 of separator 60 is shorter than depth divider 61 of FIG. 2 as it need only extend from rear wall 26 to mate with cover 32 to form splice chamber 30. In this manner, when base cover 24 is opened to permit access to network chamber 50, splice chamber 30 remains protected by cover 32.

Figure 6:
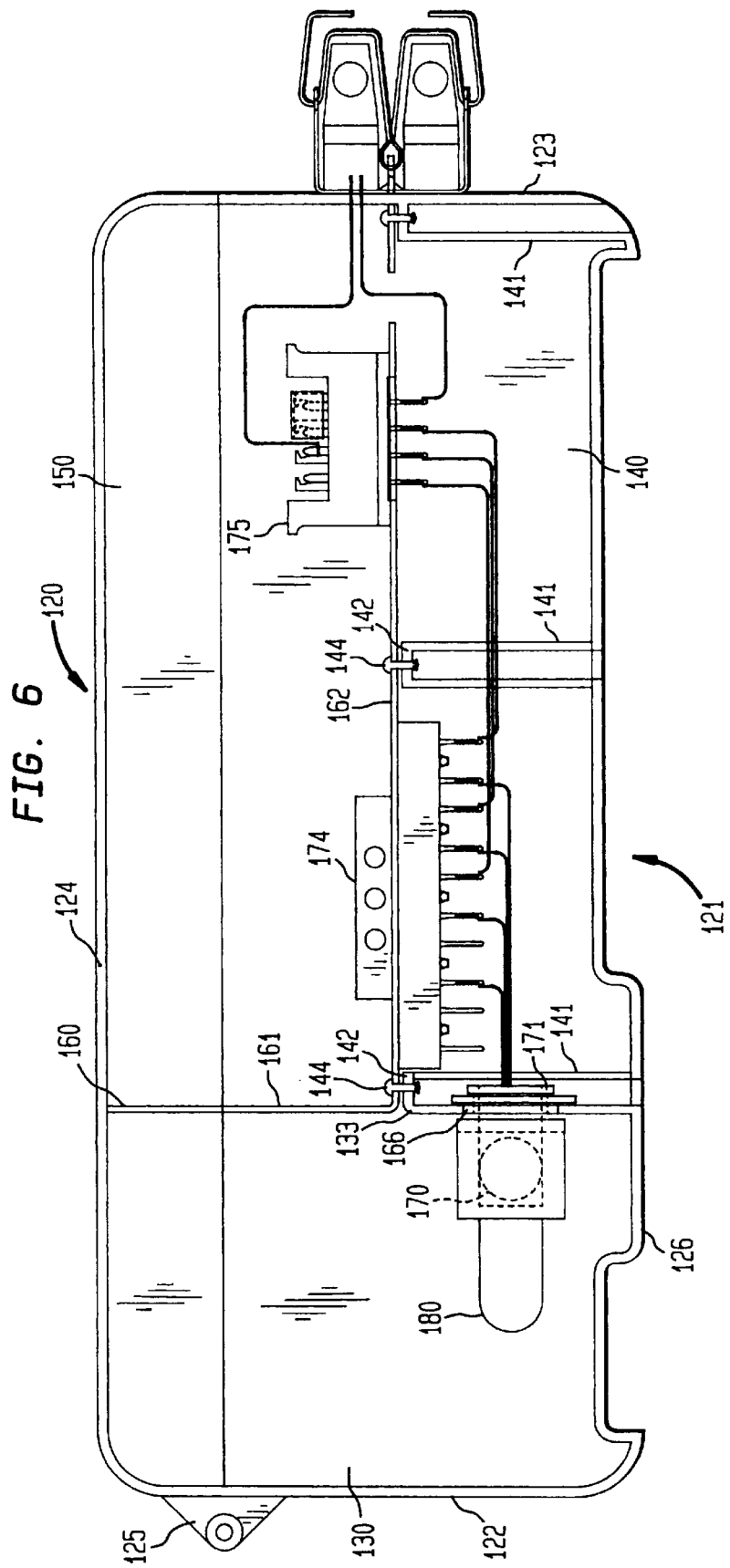
FIG. 6 is a bottom cross-sectional view of another alternate embodiment of the housing of the present invention.

Referring to FIG. 6, a third embodiment of the invention is disclosed, wherein a housing 120 includes a base 121 having a rear wall 126, side walls 122 and 123, a top wall 127 and a bottom wall 128, and a cover 124 hingedly connected to base 121 by a hinge 125. In this embodiment, a separator 160 is substantially L-shaped, and consists of a length divider 162 and a depth divider 161 extending from one end of length divider 162. A partition wall 133 extends from rear wall 126, and is formed with an opening 166 to permit a swivel stub 170 to be mounted therethrough. Depth divider 161 extends from the innermost end of dividing wall 133 to the inner surface of base cover 124. As such, splice chamber 130 is formed by dividing wall 133, depth divider 161, a portion of rear wall 126, side wall 122, a portion of cover 124, top wall 127 and bottom wall 128. Length divider 162 and dividing wall 133 together form wiring chamber 140. Further, length divider 162 divides the remainder of housing 120 into wiring chamber 140 and network chamber 150. As in the above-described embodiments, the length divider 162 supports a protector panel 174 and a connector block 175, or any other application specific combination of art-recognized componentry. Bosses 141 extend from rear wall 126 parallel to side walls 122 and 123, and include faces 142 to which length divider 162 is mounted by rivets 144 or another securement device known in the art, as described above.

Figure 7:
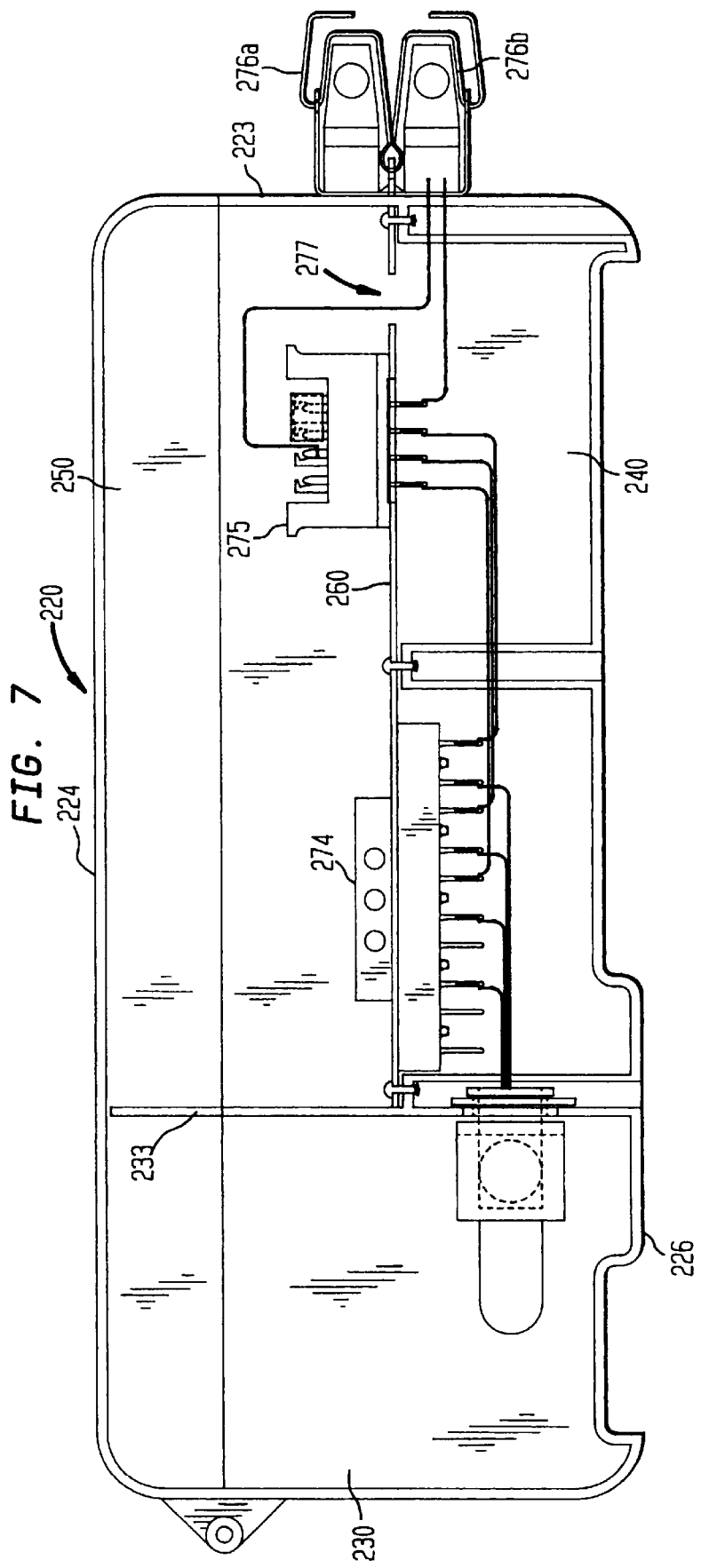
FIG. 7 is a bottom cross-sectional view of still another alternate embodiment of the housing of the present invention.

Referring to FIG. 7, a fourth embodiment of the invention is disclosed, wherein a housing 220 includes a base 221, having a rear wall 226, side walls 222, 223, a top wall 227, and a bottom wall 228, and a cover 224 hingedly connected to base 221 by a hinge 225. In this embodiment, a dividing wall 233 extends from rear wall 226 to cover 224 to create a splice chamber 230 within housing 220. A separator 260 consists of a panel that extends from side wall 223 to dividing wall 233, thereby creating a wiring chamber 240 and a network chamber 250. As in the above-described embodiments, separator 260 supports electrical components, for example, a protector panel 274 and a connector block 275. Separator 260 may contain an opening 277 to permit conductors to pass between network chamber 250 and wiring chamber 240. Side wall 223 may contain knockouts (not shown) to permit access to RJ21 connectors 276a and 276b, which are mounted to side wall 223.

In sum, the above-described embodiments of the invention provide a number of advantages. First, by providing for an insertable separator 60, the electrical components for any given design may be mounted upon separator 60 at a location remote from the installation site, such as a factory. Further, where these components are connected by conductors, they may be wired at the same time. Therefore, on-site assembly time is reduced as the electrical components are mounted and wired prior to installation.

Second, the standardization of housing 20 reduces the number of components required to be mounted at the installation site. For example, as is shown in FIG. 1, a prior art configuration can require the mounting of six or more separate components during installation, including swivel stub mounting panel 355, component mounting panel 356, network cover support bracket 357, RJ21 module 359, RJ21 mounting cover 354, and splice chamber base 352. In comparison, the present invention requires that a housing 20 be mounted to a surface and a separator be mounted within housing 20. Thus, the current invention eliminates the need for many of the components of the prior art configuration, thereby reducing stocking costs and increasing installation efficiency. Third, the configuration of the current invention conserves space as it replaces the aforementioned multiple enclosures and panels.

Fourth, the current invention permits a more orderly arrangement of cables in the splice chamber as compared to the previous arrangement where cables were run side-by-side behind swivel stub mounting panel 355. In accordance with the present invention, the position of cables in the splice chamber facilitate access to the cables once multiple housings have been mounted on over the other, the splice chamber aligning to form a substantially continuous cable trough that cables may be easily laid in.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A housing for distributing conductors from a multi-conductor cable passing within the housing, comprising a unitary enclosure base having a rear wall, a dividing wall, and a top wall, a bottom wall, a first side wall and a second side wall, each extending from the rear wall, and a selectively insertable separator detachably mounted to and disposed within said base for dividing the base into a plurality of conductor receiving chambers, said separator comprising a panel extending from one of said side walls to said dividing wall.

2. The housing of claim 1, wherein the housing further comprises a cover hingedly attached to said base.

3. The housing of claim 1, wherein the separator includes a first dividing wall for dividing an internal volume of the base along a first plane, and a second dividing wall extending at an angle from said first dividing wall for dividing the volume along a second plane, so as to form three chambers within said base.

4. The housing of claim 3, wherein the first dividing wall and a first portion of the base define a splice chamber, and the second dividing wall, the first dividing wall and a second portion of the base define, on opposite sides of said second dividing wall, a wiring chamber and a network chamber.

5. The housing of claim 4, wherein the first dividing wall has an opening, and further comprising a swivel stub disposed within the first dividing wall opening for channeling the conductors between the splice chamber and the wiring chamber.

6. The housing of claim 4, wherein the second dividing wall includes an openable portion for selectively permitting said conductors to be passed between the wiring chamber and the network chamber.

7. The housing of claim 4, wherein the second dividing wall includes an openable portion for selectively permitting said conductors to be passed between the wiring chamber and the network chamber.

8. The housing of claim 4, wherein the splice chamber includes a plurality of openings to permit a second cable to pass through the splice chamber.

9. The housing of claim 4, further comprising a swivel stub mounted to the first dividing wall and a protector field and a connector block mounted to the second dividing wall, the swivel stub being wired to the protector field and the protector field being wired to the connector block prior to mounting the separator in the base.

10. The housing of claim 3, wherein the second dividing wall is substantially perpendicular to the first dividing wall.

11. The housing of claim 10, wherein the separator is substantially T-shaped when viewed edgewise.

12. The housing of claim 10, wherein the separator is substantially L-shaped when viewed edgewise, and further comprising a base divider wall extending from the rear wall and extending in substantial co-planar alignment with the first dividing wall so that said splice chamber is defined by the base divider wall, the first dividing wall, and a portion of the base.

13. The housing of claim 3, wherein the first dividing wall is substantially parallel to the first side wall and extends from the rear wall to a cover.

14. The housing of claim 13, wherein the second dividing wall is substantially parallel to the rear wall and extends from the first dividing wall to the second side wall.

15. The housing of claim 3, comprising a protector field and a connector block mounted to the second dividing wall.

16. The housing of claim 3, comprising a splice chamber cover hingedly connected to the first side wall, and wherein the splice chamber cover, the first side wall, the first dividing wall and a portion of the base define a splice chamber.

17. The housing of claim 3, further comprising a connector mounted on the second side wall for distributing selected said conductors from within said housing to a location outside the housing.

18. The housing of claim 17, further comprising a plurality of connectors mounted to said base, each in fluid communication with the other and with the network chamber and the wiring chamber, so that selected said conductors may be routed from either chamber to any of the connectors.

19. The housing of claim 1, comprising a connector mounted on the second side wall for distributing selected said conductors from within said housing to a location outside the housing.

20. The housing of claim 1, wherein the separator extends at an angle from said dividing wall, the dividing wall and a portion of the base defining a splice chamber, and the separator and another portion of the base defining, on opposite sides of the separator, a network chamber and a splice chamber.

21. The housing of claim 1, wherein the base comprises bosses formed in the base for providing a mounting surface to which the separator is detachably mounted.

22. The housing of claim 1, wherein the base is a single, molded unit.

23. A housing for distributing wires passing therein, comprising a unitary enclosure base, a cover, and a selectively insertable chamber separator comprising at least one divider disposed within the enclosure base for dividing the housing into at least three wire-receiving chambers, at least two of the chambers being in fluid communication for the selective passage of wires therebetween.

24. The housing of claim 23, wherein said enclosure is a building entrance protector.

25. The housing of claim 24, wherein the enclosure is a network interface unit.

26. An enclosure for electrical conductors, comprising a unitary enclosure base having a rear wall, and a top wall, a bottom wall, a first side wall and a second side wall, each extending from the rear wall, a cover mounted to the base opposite said rear wall for defining, along with said base, an interior volume of the enclosure, and a plurality of internal divider walls, at least one of said divider walls being selectively removably mountable within said enclosure, for dividing the interior volume into three electrical-conductor-receiving chambers.

27. A building entrance protector comprising a unitary enclosure base having a rear wall, and a top wall, a bottom wall, a first side wall and a second side wall, each extending from the rear wall, a cover mounted to the base opposite said rear wall for defining, along with said base, an interior volume of the enclosure, and a plurality of internal divider walls, at least one of said divider walls being selectively removably mountable within said enclosure, for dividing the interior volume into a splice chamber, a wiring chamber and a network chamber.

28. The enclosure of claim 27, wherein one of the plurality of internal divider walls has a swivel stub opening, and comprising a swivel stub disposed within the swivel stub opening for passing wires from the splice chamber to the wiring chamber.

29. A housing for distributing conductors from a multi-conductor cable passing within the housing, comprising:

a unitary enclosure base having a rear wall, and a top wall, a bottom wall, a first side wall and a second side wall, each extending from the rear wall;

a cover hingedly attached to said base;

a selectively insertable separator comprising at least one divider detachably mounted to and disposed within said base for dividing the interior volume into a splice chamber, a wiring chamber and a network chamber comprising:

a first dividing wall extending substantially parallel to the first side wall from the rear wall to the cover for dividing the volume of the base along a first plane and having at least one opening; and a second dividing wall extending at an angle substantially parallel to the rear wall from the first dividing wall to the second side wall for dividing the volume along a second plane, so as to form three chambers within said base, and having at least one openable portion for selectively permitting conductors to be passed between the wiring chamber and the network chamber;

a swivel stub disposed within the first dividing wall opening for channeling conductors between the splice chamber and the wiring chamber; and a connector mounted on the second side wall for distributing selected conductors from within said housing to a location outside the housing.

\* \* \* \* \*